(12) United States Patent
Ishimaru et al.

(10) Patent No.: US 9,284,410 B2
(45) Date of Patent: Mar. 15, 2016

(54) POLYAMIDE PRODUCTION METHOD (75) Inventors: Taku Ishimaru, Nagoya (JP); Katsumi Akaike, Nagoya (JP); Daisuke Kikuno, Nagoya (JP); Tomoyuki Aoki, Nagoya (JP); Minoru Noda, Nagoya (JP); Yasunori Tsuda, Nagoya (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 14/406,607

(22) PCT Filed: Jun. 19, 2012

(86) PCT No.: PCT/JP2012/065571
§ 371 (c)(1),
(2), (4) Date: Dec. 9, 2014

(87) PCT Pub. No.: WO2013/190629
PCT Pub. Date: Dec. 27, 2013

(65) Prior Publication Data
US 2015/0158977 A1    Jun. 11, 2015

(51) Int. Cl.
| | |
|---|---|
| C08G 69/26 | (2006.01) |
| C08L 77/06 | (2006.01) |
| C08G 69/36 | (2006.01) |
| C08G 69/28 | (2006.01) |
| B29C 47/10 | (2006.01) |
| B29C 47/36 | (2006.01) |
| D01F 6/90 | (2006.01) |
| C08L 77/00 | (2006.01) |

(52) U.S. Cl.
CPC ............ C08G 69/26 (2013.01); B29C 47/1063 (2013.01); B29C 47/364 (2013.01); C08G 69/28 (2013.01); C08G 69/36 (2013.01); C08L 77/06 (2013.01); C08L 77/00 (2013.01); D01F 6/90 (2013.01)

(58) Field of Classification Search
CPC ... C08L 77/06; C08L 77/00; Y10T 428/2969; C08G 69/36; C08G 69/02; B29C 47/364; D01F 6/90
See application file for complete search history.

(56) References Cited

U.S. PATENT DOCUMENTS

| | | |
|---|---|---|
| 2010/0190934 A1 | 7/2010 | Desbois et al. |
| 2011/0144300 A1 | 6/2011 | Desbois et al. |
| 2011/0152450 A1* | 6/2011 | Kobayashi et al. ........... 524/606 |
| 2011/0301290 A1 | 12/2011 | Kato et al. |
| 2012/0016077 A1 | 1/2012 | Kato et al. |

FOREIGN PATENT DOCUMENTS

| | | |
|---|---|---|
| JP | 61-228022 A | 10/1986 |
| JP | 2009-102450 | 5/2009 |
| JP | 2010-053359 A | 3/2010 |
| JP | 4877433 B | 2/2012 |

* cited by examiner

Primary Examiner — Gregory Listvoyb
(74) Attorney, Agent, or Firm — DLA Piper LLP (US)

(57) ABSTRACT

A method of producing a polyamide includes (i) polycondensating a polyamide precursor containing a salt made from a dicarboxylic acid and a diamine under pressure in a pre-polymerization tank to obtain a prepolymer, and (ii) highly polymerizing the prepolymer with an extruder, wherein when the prepolymer in a molten state which is obtained in the step (i) is fed, by a pump, to the low-pressure extruder from the pre-polymerization tank through a discharge side pipe disposed downstream of the pump, the prepolymer is fed such that the length L [cm] of the discharge side pipe and the linear velocity of discharge v [cm/s] of the prepolymer by the pump satisfy the relationship expressed by the equation, $0.1\ [s] \leq L/v < 10\ [s]$.

4 Claims, 1 Drawing Sheet

POLYAMIDE PRODUCTION METHOD

TECHNICAL FIELD

This disclosure relates to a method of continuously producing a polyamide from a dicarboxylic acid and a diamine. More specifically, the disclosure relates to a method of continuously producing a polyamide in which a dicarboxylic acid and a diamine are polymerized to form a polyamide prepolymer, and then the polyamide prepolymer is continuously highly polymerized with an extruder.

BACKGROUND

Polyamides typified by nylon 66 are widely used for apparel, industrial fibers, automobile fields, electric/electronic fields, and extrusion molded products such as films and monofilaments taking advantage of its excellent characteristics. In recent years, materials for ultra-thin molded articles which endure use in a higher-temperature atmosphere are required and, for example, the demands for polyamides made from aromatic dicarboxylic acids predominantly composed of a dicarboxylic acid are gradually increased in the uses centering on automobile uses and connector uses. Further, an increase in demand for biobase polyamides such as nylon 410 and nylon 610 is anticipated.

In general, a polyamide made from a dicarboxylic acid and a diamine is produced by undergoing the following process.

First, a dicarboxylic acid is reacted with a diamine in water to prepare an aqueous solution of a salt serving as a raw material of a polyamide. Subsequently, the aqueous solution of the salt is heated to evaporate water and condensed to a prescribed concentration to obtain a mixed solution of a lower condensate (prepolymer) and water. Thereafter, the mixed solution is usually transferred to a batch type reactor, and then heated to allow polymerization to proceed, and water remaining after concentration and condensed water produced by polymerization are evaporated to obtain a polyamide.

However, in the above-mentioned method, since the mixed solution of prepolymer and water is retained for a long time under the condition of high-temperature, the mixed solution is easily gelated and, consequently, quality of the resulting polyamide tends to deteriorate. Thus, a production method is disclosed, in which a lower condensate is taken out in a state of solid phase and kneaded in a molten state to form a prepolymer, and then the prepolymer is polymerized in a state of solid phase (e.g., JP 61-228022 A). However, in such a batch process in which melt polymerization is combined with solid polymerization, the apparatus is complicated and inconvenient maintenance work becomes a problem.

Thus, a method of producing a polyamide, in which polymerization is continuously performed by using an extruder, is disclosed (e.g., JP 2010-53359 A).

In the production method disclosed in JP '359 described above, a prepolymer under high-temperature/high-pressure is fed from a pre-polymerization tank to an extruder under ordinary pressure or lower. In that time, the prepolymer becomes susceptible to deposition due to evaporation of water in the prepolymer and a reduction in temperature involved by a pressure reduction. Further, in a structure of a pump, generally, it is often that a discharge bore is smaller than an inlet bore to stabilize discharging, and a diameter of a pump discharge side pipe leading to downstream of a pump outlet is identical to the discharge bore of the pump. Accordingly, since the pump discharge side pipe leading to downstream of a pump has a diameter smaller than the inlet bore of the pump, a part of the pipe is clogged due to the prepolymer deposition, and therefore prepolymer discharge is unstable to easily cause abnormal retention within the pump discharge side pipe. Thereby, there is a problem that a difference in heat quantity which the prepolymer receives in the pump discharge side pipe occurs and quality of the polyamide is not stable.

It could therefore be helpful to provide a method by which the discharge of a prepolymer can be stabilized and a polyamide of stable quality can be continuously produced.

SUMMARY

We thus provide:

(1) A method of producing a polyamide comprising (i) polycondensating a polyamide precursor containing a salt made from a dicarboxylic acid and a diamine under pressure in a pre-polymerization tank to obtain a prepolymer, and (ii) highly polymerizing the prepolymer with an extruder, wherein when the prepolymer in a molten state which is obtained in (i) is fed, by a pump, to the extruder having lower pressure than the pre-polymerization tank through a discharge side pipe disposed downstream of the pump, the prepolymer is fed such that the length L [cm] of the discharge side pipe and the linear velocity of discharge v [cm/s] of the prepolymer by the pump satisfy $0.1[s] \leq L/v < 10[s]$.

(2) The method of producing a polyamide according to the paragraph (1), wherein a difference $\Delta P$ between a pressure (P1) of the pre-polymerization tank and a pressure (P2) of the extruder satisfies $0.3\ MPa \leq \Delta P < 10\ MPa$.

(3) The method of producing a polyamide according to the paragraph (1) or (2), comprising a step of obtaining the polyamide precursor having a water content of 30% by mass or less by heating/dissolving a dicarboxylic acid and a diamine.

(4) The method of producing a polyamide according to the paragraph (3), wherein the heating/dissolving is performed at a temperature of 200° C. or lower in a closed environment.

(5) The method of producing a polyamide according to any one of the paragraphs (1) to (4), wherein the polyamide precursor is retained once in a buffer tank heated at a temperature of 200° C. or lower and continuously fed from the buffer tank to the pre-polymerization tank.

(6) A polyamide production apparatus comprising a pre-polymerization tank in which a polyamide precursor containing a salt made from a dicarboxylic acid and a diamine is polycondensed under pressure to obtain a prepolymer, an extruder in which the prepolymer is highly polymerized, and a pump for feeding the prepolymer in a molten state, obtained in the pre-polymerization tank, to the extruder having lower pressure than the pre-polymerization tank, wherein a pipe length L [cm] of a discharge side pipe disposed between the pump and the extruder, and the linear velocity of discharge v [cm/s] of the prepolymer by the pump satisfy $0.1[s] \leq L/v < 10[s]$.

Since it is possible to suppress the deposition of a prepolymer or clogging of a pipe in the pump discharge side pipe, the prepolymer can be stably fed from the pre-polymerization tank to the extruder and, therefore, variations in quality of a polyamide can be reduced compared with a conventional method.

DESCRIPTION OF REFERENCE SIGNS

1: Pre-polymerization tank
2: Metering pump
3: Pump discharge side pipe
4: Extruder
L: Length of pump discharge side pipe

DETAILED DESCRIPTION

Hereinafter, an example of a method of producing a polyamide will be described in detail.

In producing a polyamide, for example, a polyamide precursor is prepared. The polyamide precursor referred to herein is a substance fed to a pre-polymerization tank described later and contains at least a salt of a dicarboxylic acid and a diamine. The polyamide precursor may further contain, as required, water and an additive such as a polymerization degree modifier or a polymerization catalyst which are described later. Further, the polyamide precursor may contain a polymer of a dicarboxylic acid and a diamine, having a relative viscosity ηr of about 1.3 or less, preferably 1.1 or less.

A dicarboxylic acid, a diamine, and, as required, water and an additive are used as a raw material to produce the polyamide precursor. The polyamide precursor is formed by mixing and heating these materials, and dissolving a raw material to cause a salt reaction or a partial polycondensation reaction. Hereinafter, a yet-to-be-heated mixture of the dicarboxylic acid, the diamine, and water and the additive used as required, is referred to as a "raw material."

The dicarboxylic acid and the diamine may be compounds which form an amide unit constituting a polyamide.

As the dicarboxylic acid, dicarboxylic acids having 2 to 18 carbon atoms are preferable, and examples thereof include adipic acid, sebacic acid, malonic acid, succinic acid, glutaric acid, pimelic acid, suberic acid, azeleic acid, undecanedioic acid, dodecanedioic acid, tetradecanedioic acid, pentadecanedioic acid, octadecanedioic, terephthalic acid, isophthalic acid, naphthalene dicarboxylic acid and the like. Two or more of these dicarboxylic acids may be used. As the dicarboxylic acid, adipic acid, sebacic acid, terephthalic acid and isophthalic acid are more preferred, and adipic acid, sebacic acid and terephthalic acid are further preferred.

As the diamine, diamines having 4 to 14 carbon atoms are preferable, and examples thereof include hexamethylene diamine(1,6-diaminohexane), 1,4-diaminobutane, 1,5-diamino-pentane, 1,7-diaminoheptane, 1,8-diaminooctane, 1,9-diaminononane, 1,10-diaminodecane, 1,11-diaminoundecane, 1,12-diaminododecane, 1,13-diaminotridecane, and 1,14-diaminotetra-decane. Two or more of these diamines may be used. Among these diamines, hexamethylene diamine, 1,4-diaminobutane and pentamethylenediamine are more preferred, and hexamethylene diamine and 1,4-diaminobutane are further preferred.

Examples of preferred combinations of a dicarboxylic acid and a diamine include combinations of (i) terephthalic acid, adipic acid and hexamethylene diamine, (ii) isophthalic acid, adipic acid and hexamethylene diamine, (iii) sebacic acid and hexamethylene diamine, and (iv) sebacic acid and 1,4-diaminobutane.

It is preferred to operate such that an amount of water of the polyamide precursor is 30% by mass or less in producing the polyamide precursor. The term "amount of water" referred to herein refers to a percentage (%) by mass of water in all polyamide precursors including a dicarboxylic acid, a diamine, water and an additive used as required. When the amount of water of the polyamide precursor exceeds 30% by mass, energy efficiency is deteriorated in producing a polyamide by using the polyamide precursor. Accordingly, the amount of water of the polyamide precursor is preferably as small as possible. Meanwhile, the amount of water in the polyamide precursor is preferably 10% by mass or more, preferably 15% by mass or more, and more preferably 20% by mass or more from the viewpoint of heating/dissolving the polyamide precursor at lower temperature and suppressing an undesirable polymerization reaction.

In the production of a polyamide precursor, it is preferred to heat/dissolve a raw material at a temperature of 200° C. or lower in a closed environment. Herein, the term "closed environment" refers to a system in/from which gas such as moisture vapor does not enter and leave. For example, when the polyamide precursor is continuously produced, it is only necessary to prevent gas such as moisture vapor from distilling off out of a system or flowing in, and the raw material may be fed in a system or the obtained polyamide precursor may be taken out of the system. By heating/dissolving a raw material in a closed environment, a flow of water out of a system can be suppressed and a polymerization reaction during heating/dissolving can be suppressed and, thereby, feeding stability of the polyamide precursor can be enhanced.

Further, when a heating temperature exceeds 200° C., an average polymerization degree of the resulting polyamide precursor increases and, therefore, feeding stability of the polyamide precursor may be deteriorated. The heating temperature is more preferably 190° C. or lower. For example, when the heating temperature at the time of heating/dissolving a raw material in a closed condition is set to 180° C., the average polymerization degree of the resulting polyamide precursor is usually less than 1. In a range in which the average polymerization degree is less than 1, the polyamide precursor can be stably and continuously fed for a long time. Herein, the average polymerization degree refers to the average value of the number of bonds between a dicarboxylic acid and a diamine in a molecule.

The pressure at the time of heating/dissolving the above-mentioned raw material is preferably set to ordinary pressure or higher to prevent inhibition of polymerization of the raw material. The pressure at the time of heating/dissolving refers a pressure in the dissolution tank at that time and, in a closed system, this pressure is determined by a water vapor pressure at dissolution equilibrium which the raw material containing water exhibits. Accordingly, this pressure can be appropriately adjusted through, for example, an amount of water contained in the raw material of the polyamide precursor and the heating temperature. Further, pressurization by an inert gas such as nitrogen may be further performed as required.

An apparatus that heats the raw material is not particularly limited and a batch type or continuous type reactor with a known heating apparatus can be used. The apparatus preferably has a stirrer so that a raw material can be stirred during heating/dissolving.

Further, when the raw material is heated/dissolved, it is preferred to remove oxygen from a raw material tank or the heating apparatus before the start of heating for the purpose of preventing coloring and degradation by oxygen. The method of removing oxygen is not particularly limited, and oxygen may be removed by a known method, for example, a method in which the heating apparatus is evacuated and replaced with an inert gas such as nitrogen in a batch manner, and a method of blowing an inert gas such as nitrogen.

Next, a method of continuously producing a polyamide from the polyamide precursor obtained by the above-mentioned method will be described. In such a method, a polyamide prepolymer (hereinafter, referred to as a "prepolymer") is obtained by using, for example, a polymerization apparatus shown in FIG. 1 and polymerizing continuously a polyamide precursor in a pre-polymerization tank 1, and the prepolymer is further continuously highly polymerized with an extruder 4 to obtain a polyamide.

Figure 1:
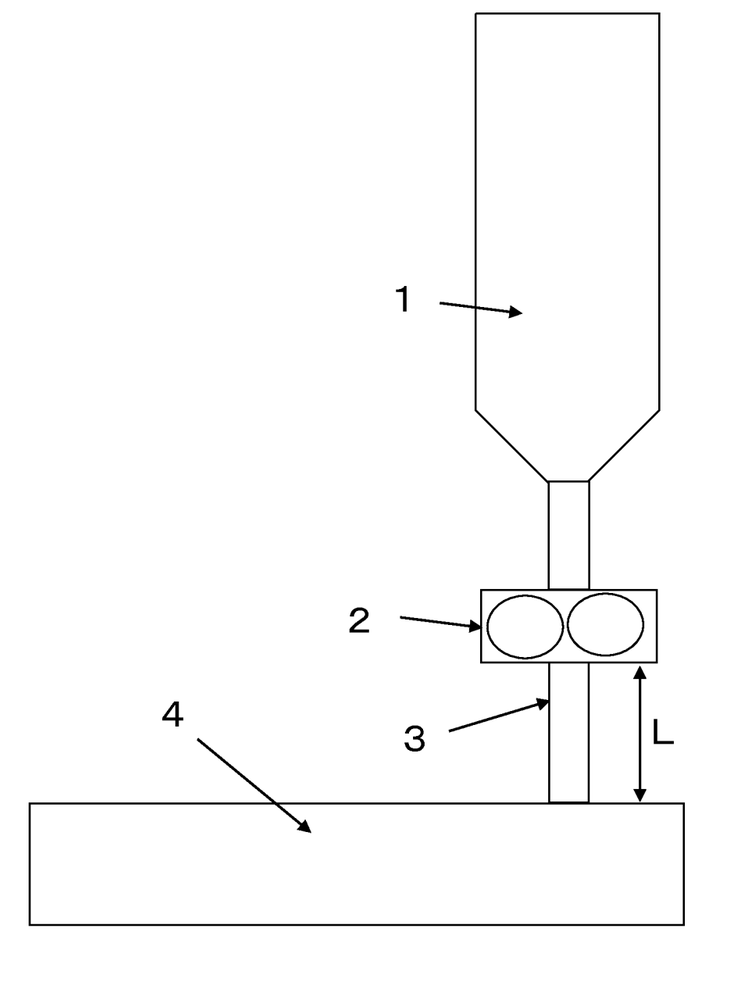
FIG. 1 is a schematic perspective view showing a production apparatus of polyamide.

It is preferred to continuously feed the polyamide precursor to the pre-polymerization tank to continuously obtain the prepolymer. When a raw material of the polyamide precursor is heated/dissolved using a batch type heating apparatus, a buffer tank is preferably disposed between the batch type heating/dissolving apparatus and the pre-polymerization tank 1. In addition, hereinafter, an aspect of disposing the buffer tank will be described in detail.

The polyamide precursor obtained by heating/dissolving is sent to the buffer tank located downstream of the heating/dissolving apparatus. The method of sending the polyamide precursor from the heating/dissolving apparatus to the buffer tank is not particularly limited, and examples of the method include a known liquid feeding method by a pump, and a method of sending a liquid by gravity by keeping pressures of the heating/dissolving apparatus and the buffer tank equal to each other. The polyamide precursor sent to the buffer tank is retained in the buffer tank until the polyamide precursor is fed to the pre-polymerization tank located downstream of the buffer tank. Thus, the temperature of the buffer tank is preferably set to 200° C. or lower. When the temperature of the buffer tank is 200° C. or lower, progress of a polymerization reaction during retention can be suppressed and therefore feeding stability of the polyamide precursor can be kept at a high level. Meanwhile, to suppress deposition of the polyamide precursor, the temperature of the buffer tank is preferably 100° C. or higher, and more preferably 110° C. or higher.

The pressure of the buffer tank is pressure in the buffer tank at the time when the polyamide precursor is retained in the buffer tank, and the pressure is mainly determined by an amount of water in the polyamide precursor and the temperature of the buffer tank. Accordingly, this pressure can be appropriately adjusted through, for example, an amount of water contained in the polyamide precursor and the temperature of the buffer tank. Further, pressurization by an inert gas such as nitrogen may be further performed as required.

The polyamide precursor retained in the buffer tank is continuously fed to a pre-polymerization tank 1 located downstream of the buffer tank by using a pump capable of volumetric feeding. The polyamide precursor is continuously polymerized within the pre-polymerization tank 1 to form a prepolymer. "Prepolymer" referred to herein is a substance obtained by the polymerization reaction of the polyamide precursor and refers to a mixture including an oligomer, an unreacted monomer, water and condensed water produced by the polymerization reaction.

The relative viscosity ($\eta r$) of the prepolymer obtained there is usually 1.1 to 2.0. Particularly, the relative viscosity of the prepolymer is preferably 1.3 or more, and more preferably 1.4 or more to highly polymerize the polymer in a subsequent step. Meanwhile, to suppress production of a gelated product in the pre-polymerization tank due to abnormal retention, the relative viscosity of the prepolymer is preferably 1.9 or less, and more preferably 1.8 or less. Herein, the relative viscosity ($\eta r$) of the prepolymer is a value by dissolving a sample in 98% sulfuric acid in a concentration of 0.01 g/ml and measuring at 25° C. by using an Ostwald viscometer according to JIS K 6810 (1994).

In addition, the polyamide precursor at the time of producing a prepolymer may be a raw material heated/dissolved in a closed environment, or may be a raw material concentrated by evaporating water from the raw material.

The reaction temperature (temperature within the pre-polymerization tank 1) at the time of producing a prepolymer is usually 260 to 320° C. The reaction temperature is preferably 270° C. or higher, and more preferably 280° C. or higher to shorten a reaction time. Meanwhile, to suppress thermal decomposition or production of a gelated product, the reaction temperature is preferably 310° C. or lower, and more preferably 300° C. or lower.

The pressure (pressure within the pre-polymerization tank 1) at the time of producing a prepolymer is usually operated to be kept at 0 to 4 MPa-G, preferably 0.3 to 3.5 MPa-G. Herein, "MPa-G" of a pressure unit means a pressure (gauge pressure) represented on the basis (zero) of an atmospheric pressure and indicates a pressure difference [MPa] between an absolute pressure and the atmospheric pressure. The pressure is preferably low from the viewpoint of feeding accuracy of the polyamide precursor and facility cost.

The reaction time at the time of producing a prepolymer is usually 10 to 120 minutes. The reaction time is preferably 30 minutes or more to facilitate high-polymerization or compositional adjustment in subsequent steps. Meanwhile, to suppress thermal decomposition or production of a gelated product, or abnormal retention, the reaction time is preferably 100 minutes or less.

The pre-polymerization tank 1 is not particularly limited. However, a vertical pre-polymerization tank, which is cylindrical and has an internal portion partitioned with a perforated plate to avoid unnecessary convection, is preferably used. In the pre-polymerization tank 1, a rectifier or the like is installed at an upper section of the pre-polymerization tank to prevent the diamine from distilling off together with water in adjusting a pressure of the pre-polymerization tank to shift a compositional ratio, and thereby distilling off of the diamine can be prevented.

To facilitate adjustment of a polymerization degree in the production of a prepolymer, addition of a polymerization degree modifier is effective, and the polymerization degree modifier may be added to the heating/dissolving apparatus in producing the polyamide precursor. Examples of the polymerization degree modifier include organic acids and/or organic bases and two or more thereof may be used. As the organic acids, for example, benzoic acid, acetic acid, and stearic acid are preferred, and benzoic acid is more preferred. Further, as the organic bases, aliphatic diamines having 4 to 14 carbon atoms are preferred. An additive amount of the polymerization degree modifier is preferably 0- to 0.1-fold mol, and more preferably 0.0001- to 0.05-fold mol with respect to the total mol of dicarboxylic acids and diamines respectively serving as a raw material.

A phosphate catalyst can also be used in production of the prepolymer. The phosphate catalyst may be added to the heating/dissolving apparatus in producing the polyamide precursor, or may be added to the pre-polymerization tank. The phosphate catalyst has a function as a catalyst for the polymerization reaction.

Specific examples of the phosphate catalyst include phosphoric acid, phosphoric salts, hypophosphorous salts, acidic phosphoric esters, phosphoric esters, phosphite esters and the like, and two or more thereof may be used.

Examples of the hypophosphorous salts include sodium hypophosphite, magnesium hypophosphite, potassium hypophosphite, calcium hypophosphite, vanadium hypophosphite, manganese hypophosphite, nickel hypophosphite, and cobalt hypophosphite.

Examples of acidic phosphoric esters include monomethyl phosphate, dimethyl phosphate, monoethyl phosphate, diethyl phosphate, propyl phosphate, isopropyl phosphate, dipropyl phosphate, diisopropyl phosphate, butyl phosphate, isobutyl phosphate, dibutyl phosphate, diisobutyl phosphate, monophenyl phosphate, and diphenyl phosphate.

Examples of phosphoric esters include trimethyl phosphate, triethyl phosphate, tri-n-propyl phosphate, tri-i-propyl phosphate, tri-n-butyl phosphate, tri-i-butyl phosphate, triphenyl phosphate, tri-n-hexyl phosphate, tri-n-octyl phosphate, tri(2-ethylhexyl)phosphate, and tridecyl phosphate.

Among these, hypophosphorous salts are preferred, and sodium hypophosphite is particularly preferred.

When the phosphate catalyst is added, an additive amount thereof is preferably 0.001 to 5 parts by mass, and more preferably 0.01 to 1 part by mass with respect to 100 parts by mass of the prepolymer.

The prepolymer obtained in the pre-polymerization tank 1 is fed to an extruder 4 through a pump discharge side pipe 3 connected to a discharge bore of a metering pump 2 by the metering pump 2. In this time, the prepolymer is fed such that a pipe length (hereinafter, L [cm]) of the pump discharge side pipe 3 and a linear velocity of discharge (hereinafter, v [cm/s]) of the prepolymer satisfy the relationship expressed by: $0.1[s] \leq L/v \leq 10[s]$. This relationship is preferably $0.1[s] \leq L/v < 8[s]$, and more preferably $0.1[s] \leq L/v < 5[s]$. The prepolymer becomes susceptible to deposition/solidification because of a reduction in temperature due to water evaporation by a rapid pressure reduction in the pump discharge side pipe 3 and evaporative latent heat. When the prepolymer is deposited and solidified, the pump discharge side pipe is partially clogged and discharge is not stable. Then, by setting L and v to satisfy the above-mentioned relationship to shorten the period of time while the prepolymer is under the influence of reduction in temperature, it is possible to suppress clogging of the pipe due to deposition of a prepolymer in the pump discharge side pipe. Thereby, the discharge of the prepolymer is stabilized and a heat history received from the pipe is also stabilized and, therefore, properties of the polyamide ultimately obtained can be stabilized.

In addition, the term "pump discharge side pipe 3" referred to herein does not include a pump interior portion and a flow path of a pump block attached to the pump, and refers to a pipe which is disposed downstream of the pump and the pump block and extends to an extruder.

Further, the linear velocity of discharge [s] of the prepolymer is a value (Q/S) obtained by dividing a prepolymer discharge amount Q [cm$^3$/s] of the pump 2 by a discharge bore cross-sectional area S [cm$^2$] of the pump.

The pre-polymerization tank that produces the prepolymer is not particularly limited. However, the extruder disposed downstream of thereof is preferably a twin-screw extruder having a self-cleaning property.

The prepolymer continuously fed to the extruder 4 is usually melt-kneaded in a temperature range of a melting point of the polyamide ultimately obtained plus 5° C. to the melting point plus 40° C., preferably from the melting point plus 10° C. to the melting point plus 40° C. and, consequently, it becomes a polyamide through a polymerization reaction. This temperature is preferably the melting point plus 5° C. or higher to increase the rate of a polymerization reaction. Further, to prevent thermal decomposition or production of a gelated product, the temperature is preferably the melting point plus 40° C. or lower. Herein, the melting point of a polyamide refers to a temperature at which a melting curve obtained by measuring at a temperature raising rate of 20° C/min by a DSC method exhibits a maximum value.

The prepolymer containing water is continuously fed to the extruder 4. Therefore, it is preferred to continuously remove water through a rear vent or a first vent disposed in the vicinity of a supply port. When this configuration is employed, a polyamide which is highly polymerized by a more stable polymerization reaction can be easily obtained. Further, it is preferred that at least one vent port is disposed other than the above-mentioned vent to discharge water produced by the polymerization reaction of the prepolymer and a tiny amount of an unreacted monomer out of a system. By doing so, the polymerization reaction proceeds and a highly polymerized polyamide can be easily produced. In addition, emission at the vent port is preferably performed under reduced pressure by usually using a known pressure reducing device/vacuum device such as a Nash pump. However, the pressure is not particularly limited and the emission can also be performed under ordinary pressure.

The difference ($\Delta P = P1-P2$) between a pressure (P1) of the pre-olymerization tank 1 and a pressure (P2) of the extruder 4 is preferably 0.3 MPa or more and less than 10 MPa. When the pressure difference between the pre-polymerization tank 1 and the extruder 4 is 0.3 MPa or more, since deterioration of the discharge stability due to clogging of the pump discharge side pipe and variations in quality involved tend to increase, the effect is more markedly achieved. Meanwhile, when the pressure difference between the pre-polymerization tank 1 and the extruder 4 is less than 10 MPa, it is possible to reduce the amount of water in the prepolymer evaporated by a pressure reduction and a reduction in temperature due to evaporative latent heat in the evaporation of water. Thus, it is possible to more reduce the deposition of a prepolymer in a pipe, which results from the reduction of water content of the prepolymer and the reduction in temperature, and clogging of the pipe associated with the deposition. The pressure difference $\Delta P$ is more preferably 0.3 MPa or more and less than 5 MPa.

The retention time of a polymer in the extruder 4 is not particularly limited. However, the retention time is preferably 1 to 10 minutes, and more preferably 1 to 5 minutes to proceed with polymerization to the viscosity enough for a polyamide and suppress thermal degradation or thermal decomposition due to a prolonged period of retention.

The gelation degree of the polyamide ultimately obtained can be evaluated by quantitatively measuring a secondary amine produced by a side reaction of a diamine and becomes a factor for gelation of the polyamide. For example, in a polyamide like polyamide 66 or polyamide 610 whose diamine component is hexamethylene diamine, by converting hexamethylene diamine to a secondary amine, bis(hexamethylene)triamine (hereinafter, referred to as triamine) represented by Formula (1):

$$H_2N-(CH_2)_6-NH-(CH_2)_6-NH_2 \quad (1),$$

is produced, and by the reaction of the triamine with a dicarboxylic acid component, a main chain of the polymer is branched to three chains.

Further, in any step of a prepolymer production step and a high-polymerization step of a prepolymer, as required, a catalyst, a heat-resistance stabilizer, a weatherability stabilizer, an antioxidant, a plasticizer, a release agent, a lubricant, a crystal nucleating agent, a pigment, a dye, or other polymers may also be added.

The polyamide obtained by the production method has smaller variations in quality than a polyamide by a conventional method since a prepolymer can be stably fed from the pre-polymerization tank to the extruder. Therefore, handleability in molding can be improved, and an unmelted material can be reduced in a molded article. The molding method is not particularly limited, and known molding methods such as injection molding, extrusion molding, blow molding and press molding can be used. The term "molded article" referred to herein includes molded articles by injection molding or the like, and shaped articles such as a fiber, a film, a sheet, a tube and a monofilament.

EXAMPLES

Hereinafter, our methods will be specifically described by way of Examples. In addition, methods of evaluating the properties described in Examples and Comparative Examples are as follows.
(1) Relative Viscosity ($\eta r$)
The relative viscosity was measured at 25° C. by dissolving a sample in 98% sulfuric acid in a concentration of 0.01 g/ml and using an Ostwald viscometer according to JIS K 6810 (1994).
(2) Melting Point (Tm)
Using DSC (manufactured by PerkinElmer, Inc.), 8 to 10 mg of samples were measured at a temperature raising rate of 20° C./min, and a temperature, at which a obtained melting curve exhibits a maximum value, is defined as a melting point.
(3) Amount of Bis(hexamethylene)triamine (triamine)
About 0.06 g of a sample was hydrolyzed for 3 hours in a condition of 150° C. with an aqueous solution of hydrobromic acid, and to the resulting processed solution, a 40% sodium hydroxide aqueous solution and toluene were added, then ethyl chloroformate was added, and the resulting mixture was stirred. A toluene solution of a supernatant was extracted to use as a measurement solution. A bis(hexamethylene)triamine standard solution was used for a quantitative test. The above-mentioned sample was analyzed by gas chromatography.
Gas Chromatography Analysis Condition
   Apparatus: GC-14A manufactured by SHIMADZU CORPORATION
   Column: NB-1 (manufactured by GL Sciences Inc.) 60 mm×0.25 mm
   Detector: FID (hydrogen flame ionization detector)
   Oven temperature: Temperature is raised at 10° C./min from 150° C. to 330° C.
   Temperature of a sample injection section: 250° C.
   Detector temperature: 330° C.
   Carrier gas: He
   Amount of sample injection: 3.0 ml

Example 1

Into a 350 L dissolution tank having a stirrer and a jacket-heating function, 69.0 kg of hexamethylene diamine not substantially containing water and 87.3 kg of water were charged. Subsequently, 40.7 kg of adipic acid not substantially containing water and 52.5 kg of terephthalic acid not substantially containing water were charged, and nitrogen substitution was performed. Moreover, sodium hypophosphite was added as a polymerization catalyst in an amount of 0.05 parts by mass with respect to 100 parts by mass of the polyamide ultimately obtained. Further, benzoic acid was added as a polymerization degree modifier to be 0.0133-fold mol with respect to the total mol of dicarboxylic acids and a diamine. In this time, the water content in all charged materials was 35% by mass. Then, the dissolution tank was heated at 180° C. to evaporate and remove water in a system. The water was removed until a water content in the system ultimately reached 20% by mass to obtain a polyamide precursor.

Subsequently, the polyamide precursor was sent to the buffer tank by pressurizing the dissolution tank with nitrogen, and a retention temperature of the polyamide precursor in the buffer tank was maintained at 160° C. The polyamide precursor obtained by the above-mentioned method was continuously fed to a 4 L cylindrical vertical pre-polymerization tank at a feed rate of 6.30 kg/hr by a plunger pump, and was continuously polymerized in the conditions described in Table 1 to form a prepolymer. The obtained prepolymer was fed to a twin-screw extruder by a gear pump and highly polymerized in the conditions described in Table 1 to obtain a polyamide. In addition, with respect to the relationship L/V between the length (L) of the pump discharge side pipe and the linear velocity of discharge (v) of the prepolymer, L/V was 2.7 [s]. The operation was continued for 10 hours, a sample was taken every 30 minutes and various properties were measured. The obtained polyamide had a viscosity ($\eta r$) of 2.37 to 2.41 and a melting point of 298 to 300° C., and the amount of triamine was 0.32 to 0.36%, and therefore stable polymer properties were attained.

Example 2

Polyamide was obtained in the same manner as in Example 1 except for changing conditions of the pre-polymerization tank as shown in Table 1. The operation was continued for 10 hours, a sample was taken every 30 minutes and various properties were measured. The obtained polyamide had a viscosity ($\eta r$) of 2.40 to 2.43 and a melting point of 300 to 301° C., and the amount of triamine was 0.32 to 0.35% and, therefore, stable polymer properties were attained.

Comparative Example 1

Polyamide was obtained in the same manner as in Example 1 except for changing the L/v as shown in Table 1. The operation was continued for 10 hours, a sample was taken every 30 minutes and various properties were measured. The obtained polyamide had a viscosity ($\eta r$) of 2.30 to 2.58 and a melting point of 297 to 304° C., and the amount of triamine was 0.35 to 0.61%, and therefore a fluctuation range of polymer properties was large.

Example 3

Polyamide was obtained in the same manner as in Example 1 except for changing the L/v as shown in Table 1. The operation was continued for 10 hours, a sample was taken every 30 minutes and various properties were measured. The obtained polyamide had a viscosity ($\eta r$) of 2.39 to 2.44 and a melting point of 299 to 301° C., and the amount of triamine was 0.33 to 0.37%, and therefore stable polymer properties were attained.

Example 4

A polyamide precursor was obtained in the same manner as in Example 1 except for changing the pressure of the dissolution tank such that the water content of the polyamide precursor be 30% by mass. Using the obtained polyamide precursor, a prepolymer was obtained in the same manner as in Example 1, and further a polyamide was obtained. The operation was continued for 10 hours, a sample was taken every 30 minutes and various properties were measured. The obtained polyamide had a viscosity ($\eta r$) of 2.23 to 2.28 and a melting point of 296 to 299° C., and the amount of triamine was 0.28 to 0.31 and therefore stable polymer properties were attained.

Example 5

Into a 350 L dissolution tank having a stirrer and a jacket-heating function, 69.0 kg of hexamethylene diamine not substantially containing water and 28.6 kg of water were charged. Subsequently, 40.7 kg of adipic acid not substantially containing water and 52.5 kg of terephthalic acid not substantially containing water were charged, and nitrogen substitution was performed. Moreover, sodium hypophosphite was added as a polymerization catalyst in an amount of 0.05 parts by mass with respect to 100 parts by mass of the polyamide ultimately obtained. Further, benzoic acid was added as a polymerization degree modifier to be 0.0133-fold mol with respect to the total mol of dicarboxylic acids and a diamine. In this time, the water content in all charged materials was 15% by mass. Then, the dissolution tank was changed to a closed system and heated until an internal temperature of the tank reached 180° C. to obtain a polyamide precursor.

Using the polyamide precursor obtained by the above-mentioned method, a prepolymer was obtained in the same manner as in Example 1, and further a polyamide was obtained. The operation was continued for 10 hours, a sample was taken every 30 minutes and various properties were measured. The obtained polyamide had a viscosity ($\eta r$) of 2.41 to 2.44 and a melting point of 300 to 302° C., and the amount of triamine was 0.34 to 0.37 and, therefore, stable polymer properties were attained.

Example 6

Polyamide precursor was obtained in the same manner as in Example 1 except for heating the dissolution tank until an internal temperature of the tank reached 170° C. in dissolving the raw material. The water content of the polyamide precursor was 20% by mass. A prepolymer was obtained in the same manner as in Example 1 except for using the obtained polyamide precursor and maintaining a retention temperature at the buffer tank at 150° C., and further a polyamide was obtained. The operation was continued for 10 hours, a sample was taken every 30 minutes and various properties were measured. The obtained polyamide had a viscosity ($\eta r$) of 2.35 to 2.38 and a melting point of 297 to 299° C., and the amount of triamine was 0.31 to 0.33 and, therefore, stable polymer properties were attained.

Example 7

A polyamide precursor was obtained in the same manner as in Example 5 except for changing the charged amount of water to 40.6 kg. The water content of the polyamide precursor was 20% by mass. A prepolymer was obtained in the same manner as in Example 1 except for using the obtained polyamide precursor and maintaining a retention temperature at the buffer tank at 180° C., and further a polyamide was obtained. The operation was continued for 10 hours, a sample was taken every 30 minutes and various properties were measured. The obtained polyamide had a viscosity ($\eta r$) of 2.39 to 2.42 and a melting point of 299 to 301° C., and the amount of triamine was 0.33 to 0.37 and, therefore, stable polymer properties were attained.

Example 8

A polyamide precursor was obtained in the same manner as in Example 1. The water content of the polyamide precursor was 20% by mass. A prepolymer was obtained in the same manner as in Example 1 except for using the obtained polyamide precursor and maintaining a retention temperature at the buffer tank at 210° C., and further a polyamide was obtained. The operation was continued for 10 hours, a sample was taken every 30 minutes and various properties were measured. The obtained polyamide had a viscosity ($\eta r$) of 2.43 to 2.47 and a melting point of 300 to 302° C., and the amount of triamine was 0.37 to 0.42, and therefore stable polymer properties were attained. There was not a problem during the initial stage of continuously feeding the polyamide precursor, but the problem of inability to feed arose after a lapse of 12 hours from a start of continuous feeding.

Example 9

Into a 350 L dissolution tank having a stirrer and a jacket-heating function, 70.4 kg of hexamethylene diamine not substantially containing water and 96.9 kg of water were charged. Subsequently, 49.2 kg of sebacic acid not substantially containing water and 60.4 kg of terephthalic acid not substantially containing water were charged, and nitrogen substitution was performed. Moreover, sodium hypophosphite was added as a polymerization catalyst in an amount of 0.05 parts by mass with respect to 100 parts by mass of the polyamide obtained after polymerization. Further, benzoic acid was added as a polymerization degree modifier to be 0.0133-fold mol with respect to the total mol of dicarboxylic acids and a diamine. The water content in all charged materials was 35% by mass. Then, a polyamide precursor having a water content of 20% by mass was obtained in the same manner as in Example 1. Using the obtained polyamide precursor, a prepolymer was obtained in the same manner as in Example 1, and further a polyamide was obtained. The operation was continued for 10 hours, a sample was taken every 30 minutes and various properties were measured. The obtained polyamide had a viscosity ($\eta r$) of 2.37 to 2.41 and a melting point of 301 to 303° C., and the amount of triamine was 0.33 to 0.37 and, therefore, stable polymer properties were attained.

Example 10

A polyamide precursor having a water content of 35% was obtained in the same manner as in Example 1 except for changing the charged amount of water to 108.1 kg. Using the obtained polyamide precursor, a prepolymer was obtained in the same manner as in Example 1, and further a polyamide was obtained. The operation was continued for 5 hours, a sample was taken every 30 minutes and various properties were measured. The obtained polyamide had a viscosity ($\eta r$) of 2.14 to 2.18 and a melting point of 294 to 297° C., and the amount of triamine was 0.22 to 0.25.

Example 11

A polyamide precursor was obtained in the same manner as in Example 1 except that the dissolution tank was heated until an internal temperature of the tank reached 210° C. in dissolving the raw material and the water was removed until a water content in the system ultimately reached 20% by mass. A prepolymer was obtained in the same manner as in Example 1 except for using the obtained polyamide precursor and changing a retention temperature at the buffer tank to 180° C., and further a polyamide was obtained. The operation was continued for 5 hours, a sample was taken every 30 minutes and various properties were measured. The obtained polyamide had a viscosity ($\eta r$) of 2.46 to 2.52 and a melting point of 300 to 302° C., and the amount of triamine was 0.38 to 0.44.

Various conditions and evaluation results of Examples and Comparative Examples are shown in Table 1.

| | | | Example 1 | Example 2 | Example 3 | Example 4 | Example 5 | Example 6 | Example 7 | Example 8 |
|---|---|---|---|---|---|---|---|---|---|---|
| Charge Amount of Raw Material | Adipic Acid | kg | 40.7 | 40.7 | 40.7 | 40.7 | 40.7 | 40.7 | 40.7 | 40.7 |
| | Terephthalic Acid | kg | 52.5 | 52.5 | 52.5 | 52.5 | 52.5 | 52.5 | 52.5 | 52.5 |
| | Sebacic Acid | kg | 0 | 0 | 0 | 0 | 0 | 0 | 0 | 0 |
| | Hexamethylene Diamine | kg | 69.0 | 69.0 | 69.0 | 69.0 | 69.0 | 69.0 | 69.0 | 69.0 |
| | Water | kg | 87.3 | 87.3 | 87.3 | 87.3 | 28.6 | 87.3 | 40.6 | 87.3 |
| | Amount of Water | % by mass | 35 | 35 | 35 | 35 | 15 | 35 | 20 | 35 |
| Production Step of Polyamide Precursor | Heating Method | — | Concentration by Evaporation | Concentration by Evaporation | Concentration by Evaporation | Concentration by Evaporation | Closed System | Concentration by Evaporation | Closed System | Concentration by Evaporation |
| | Amount of Water | % by mass | 20 | 20 | 20 | 30 | 15 | 20 | 20 | 20 |
| Buffer Tank | Temperature | °C. | 180 | 180 | 180 | 180 | 180 | 170 | 180 | 180 |
| Prepolymerization Tank | Temperature | °C. | 160 | 160 | 160 | 160 | 160 | 150 | 180 | 210 |
| | Temperature | °C. | 295 | 295 | 295 | 295 | 295 | 295 | 295 | 295 |
| | Pressure (P1) | Mpa-G | 3.50 | 2.60 | 3.50 | 3.50 | 3.50 | 3.50 | 3.50 | 3.50 |
| | Time | min | 50 | 50 | 50 | 50 | 50 | 50 | 50 | 50 |
| Discharge Side Pipe | L/v | sec | 2.7 | 2.7 | 4.6 | 2.7 | 2.7 | 2.7 | 2.7 | 2.7 |
| Extruder | Temperature | °C. | 320 | 320 | 320 | 320 | 320 | 320 | 320 | 320 |
| | Vent Port Pressure (P2) | Mpa-G | 0.0 | 0.0 | 0.0 | 0.0 | 0.0 | 0.0 | 0.0 | 0.0 |
| | Time | min | 3 | 3 | 3 | 3 | 3 | 3 | 3 | 3 |
| Polymer Properties | Viscosity (ηr) | — | 2.37-2.41 | 2.40-2.43 | 2.39-2.44 | 2.23-2.28 | 2.41-2.44 | 2.35-2.38 | 2.39-2.42 | 2.43-2.47 |
| | Melting Point | °C. | 298-300 | 300-301 | 299-301 | 296-299 | 300-302 | 297-299 | 299-301 | 300-302 |
| | Amount of Triamine | % by mass | 0.32-0.36 | 0.32-0.35 | 0.33-0.37 | 0.28-0.31 | 0.34-0.37 | 0.31-0.33 | 0.33-0.37 | 0.37-0.42 |

| | | | Example 5 | Example 6 | Example 7 | Example 8 | Example 9 | Example 10 | Example 11 | Comparative Example 1 |
|---|---|---|---|---|---|---|---|---|---|---|
| Charge Amount of Raw Material | Adipic Acid | kg | 40.7 | 40.7 | 40.7 | 40.7 | 0 | 40.7 | 40.7 | 40.7 |
| | Terephthalic Acid | kg | 52.5 | 52.5 | 52.5 | 52.5 | 60.4 | 52.5 | 52.5 | 52.5 |
| | Sebacic Acid | kg | 0 | 0 | 0 | 0 | 49.2 | 0.0 | 0.0 | 0.0 |
| | Hexamethylene Diamine | kg | 69.0 | 69.0 | 69.0 | 69.0 | 70.4 | 69.0 | 69.0 | 69.0 |
| | Water | kg | 28.6 | 87.3 | 40.6 | 87.3 | 96.9 | 106.7 | 87.3 | 87.3 |
| | Amount of Water | % by mass | 15 | 35 | 20 | 35 | 35 | 40 | 35 | 35 |
| Production Step of Polyamide Precursor | Heating Method | — | Closed System | Concentration by Evaporation | Closed System | Concentration by Evaporation | Concentration by Evaporation | Concentration by Evaporation | Concentration by Evaporation | Concentration by Evaporation |
| | Amount of water | % by mass | 15 | 20 | 20 | 20 | 20 | 35 | 20 | 20 |
| Buffer Tank | Temperature | °C. | 180 | 170 | 180 | 180 | 180 | 160 | 210 | 180 |
| Prepolymerization Tank | Temperature | °C. | 160 | 150 | 180 | 210 | 160 | 160 | 180 | 160 |
| | Temperature | °C. | 295 | 295 | 295 | 295 | 295 | 295 | 295 | 295 |
| | Pressure (P1) | Mpa-G | 3.50 | 3.50 | 3.50 | 3.50 | 3.50 | 3.50 | 3.50 | 3.50 |
| | Time | min | 50 | 50 | 50 | 50 | 50 | 50 | 50 | 50 |
| Discharge Side Pipe | L/v | sec | 2.7 | 2.7 | 2.7 | 2.7 | 2.7 | 2.7 | 2.7 | 16.5 |
| Extruder | Temperature | °C. | 320 | 320 | 320 | 320 | 320 | 320 | 320 | 320 |
| | Vent Port Pressure (P2) | Mpa-G | 0.0 | 0.0 | 0.0 | 0.0 | 0.0 | 0.0 | 0.0 | 0.0 |
| | Time | min | 3 | 3 | 3 | 3 | 3 | 3 | 3 | 3 |
| Polymer Properties | Viscosity (ηr) | — | 2.41-2.44 | 2.35-2.38 | 2.39-2.42 | 2.43-2.47 | 2.37-2.41 | 2.14-2.18 | 2.46-2.52 | 2.30-2.58 |
| | Melting Point | °C. | 300-302 | 297-299 | 299-301 | 300-302 | 300-303 | 294-297 | 300-302 | 297-304 |
| | Amount of Triamine | % by mass | 0.34-0.37 | 0.31-0.33 | 0.33-0.37 | 0.37-0.42 | 0.33-0.37 | 0.22-0.25 | 0.38-0.44 | 0.35-0.61 |

The invention claimed is:

1. A method of producing a polyamide comprising (i) polycondensating a polyamide precursor containing a salt made from a dicarboxylic acid and a diamine under pressure in a pre-polymerization tank to obtain a prepolymer, and (ii) highly polymerizing the prepolymer with an extruder,
wherein, when the prepolymer in a molten state in (i) is fed by a pump to the extruder having lower pressure than the pre-polymerization tank through a discharge side pipe disposed downstream of the pump, the prepolymer is fed such that length L [cm] of the discharge side pipe and linear velocity of discharge v [cm/s] of the prepolymer by the pump satisfy $0.1[s] \leq L/v < 10[s]$, and
wherein a difference $\Delta P$ between a pressure (P1) of the pre-polymerization tank and a pressure (P2) of the extruder satisfies $0.3 \text{ MPa} \leq \Delta P < 10 \text{ MPa}$.

2. The method according to claim 1, comprising (iii) obtaining the polyamide precursor having a water content of 30% by mass or less by heating/dissolving a dicarboxylic acid and a diamine.

3. The method according to claim 2, wherein the heating/dissolving is performed at a temperature of 200° C. or lower in a closed environment.

4. The method according to claim 1, wherein the polyamide precursor is retained once in a buffer tank heated at a temperature of 200° C. or lower and continuously fed from the buffer tank to the pre-polymerization tank.

* * * * *